(12) United States Patent  
Hsu et al.

(10) Patent No.: US 12,511,872 B2  
(45) Date of Patent: Dec. 30, 2025

(54) SYSTEM FOR DETERMINING TRADEMARK SIMILARITY

(71) Applicant: The Regents of the University of California, Oakland, CA (US)

(72) Inventors: Ming Hsu, San Francisco, CA (US); Andrew Stewart Kayser, Corte Madera, CA (US); Zhihao Zhang, Cupertino, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 288 days.

(21) Appl. No.: 18/553,676

(22) PCT Filed: Jan. 31, 2022

(86) PCT No.: PCT/US2022/070441  
§ 371 (c)(1),  
(2) Date: Oct. 2, 2023

(87) PCT Pub. No.: WO2022/212971  
PCT Pub. Date: Oct. 6, 2022

(65) Prior Publication Data  
US 2024/0161457 A1 May 16, 2024

Related U.S. Application Data

(60) Provisional application No. 63/170,390, filed on Apr. 2, 2021.

(51) Int. Cl.  
*G06K 9/00* (2022.01)  
*A61B 5/055* (2006.01)  
(Continued)

(52) U.S. Cl.  
CPC ............ *G06V 10/761* (2022.01); *A61B 5/055* (2013.01); *G06V 10/25* (2022.01)

(58) Field of Classification Search  
None  
See application file for complete search history.

(56) References Cited

U.S. PATENT DOCUMENTS 6,567,569 B1    5/2003   Claessens  
9,179,893 B2   11/2015   Endo et al.  
(Continued)

OTHER PUBLICATIONS

Schaefer et al., "Neural correlates of culturally familiar brands of car manufacturers" (Year: 2006).*

(Continued)

*Primary Examiner* — SJ Park  
(74) *Attorney, Agent, or Firm* — McCoy Russell LLP (57) ABSTRACT

A computer-implemented method can include: visually presenting visual stimuli to participants in multiple runs, wherein the visual stimuli include pairs of images, each pair including a reference product image and a competitor product image; performing multiple scans on the participants during passive viewing of the visual presenting, the scans including functional magnetic resonance imaging (fMRI); and determining a similarity index based on results of the scans, the similarity index indicating a level a perceived similarity between the reference product image and the competitor product image.

19 Claims, 8 Drawing Sheets

(51) Int. Cl.
    *G06V 10/25*     (2022.01)
    *G06V 10/74*     (2022.01)

(56)     References Cited

U.S. PATENT DOCUMENTS

| | | |
|---|---|---|
| 9,280,784 B2 | 3/2016 | Barnett et al. |
| 2015/0100376 A1 | 4/2015 | Lebrecht et al. |
| 2018/0253732 A1* | 9/2018 | Bakalash ........... G06Q 30/0201 |
| 2019/0159715 A1 | 5/2019 | Mishra Ramanathan et al. |
| 2020/0170524 A1 | 6/2020 | Assaf et al. |

OTHER PUBLICATIONS

Reimann et al., "Novel versus familiar brands: an analysis on neurophysiology, response latency, and choice" (Year: 2012).*

Al-Kwifi et al., "Identifying the influence of the Halal logo on Muslim consumers' attitudes using fMRI technology" (Year: 2020).*

Santos, "Perceiving brands after logos perception: an event-related fMRI study" (Year: 2010).*

ISA Korean Intellectual Property Office, International Search Report and Written Opinion Issued in Application No. PCT/US2022/070441, May 20, 2022, WIPO, 10 pages.

D'astous, A et al., "Consumer evaluations of brand imitations," European Journal of Marketing, vol. 35, No. 1/2, Feb. 1, 2001, 15 pages.

Krekelberg, B et al., "Adaptation: from single cells to BOLD signals," Trends in Neurosciences, vol. 29, No. 5, May 2006, 7 pages.

Satomura, T et al., "Copy alert: A method and metric to detect visual copycat brands.," Journal of Marketing Research, vol. 51, No. 1, 2014, 13 pages.

Barron, H et al., "Repetition suppression: a means to index neural representations using BOLD?," The Royal Society Publishing, vol. 371, No. 1705, Oct. 5, 2016, 14 pages.

* cited by examiner

SYSTEM FOR DETERMINING TRADEMARK SIMILARITY

CROSS REFERENCE TO RELATED APPLICATION

The present application is a U.S. National Stage application which claims priority to International PCT Application No. PCT/US2022/070441 entitled "SYSTEM FOR DETERMINING TRADEMARK SIMILARITY", and filed on Jan. 31, 2022. International PCT Application No. PCT/US2022/070441 claims priority to U.S. Provisional Application No. 63/170,390 entitled "USING NEURAL REPRESENTATIONS TO INFORM THE REASONABLE PERSON STANDARD", and filed on Apr. 2, 2021. The entire contents of the above-listed applications are hereby incorporated by reference for all purposes.

TECHNICAL FIELD

The present description relates generally to systems and methods for determining trademark similarity.

BACKGROUND AND SUMMARY

Did the song "Blurred Lines" plagiarize from Marvin Gaye's "Got to Give it Up"? Does the toothpaste Colddate infringe upon the trademark of Colgate? When should an image be considered "obscene", in which case it is not protected by the First Amendment? Although vastly different in the underlying facts and legal standards in question, under the U.S. legal system and that of many other countries, these cases often involve legal tests that invoke the viewpoint of a class of hypothetical individuals, of whom the oldest and most well-known is the so-called "reasonable person" from tort law. More recent members include the "reasonable consumer", the "average person", and the "fair-minded and informed observer", among others, depending on the specific area of the law they occupy. Regardless of the specific identity of the reasonable person, however, all legal tests invoking its various incarnations involve asking how an individual with "an ordinary or average level of care, prudence, or knowledge" would respond—i.e., by applying a "reasonable person test."

Despite the seemingly commonsensical nature of these tests, however, their application is often controversial. Legal scholars have long criticized tests based on the reason person for being vulnerable to bias and manipulation, particularly under an adversarial legal system. A study of copyright fair use, for example, found that respondents were routinely influenced by factors, such as the plaintiff's efforts in creating the work, that have been deemed irrelevant by the courts. Similarly, in the context of trademark infringement, seemingly subtle variations in the wording of litigation survey questions can exert substantial influence over similarity judgments. In recognition of these issues, judges often exercise discretion to exclude or minimize the import of self-report evidence, typically collected and presented to the court by expert witnesses. No less than the eminent legal scholar Richard Posner remarked in a legal opinion that, "Many experts are willing for a generous (and sometimes for a modest) fee to bend their science in the direction from which their fee is coming". However, the reliance of judges on their own subjective assessments has been likewise criticized for replacing one set of biases with another.

As a result, courts have long sought mechanisms capable of supplementing existing means for determining what constitutes the response of a reasonable person.

Certain implementations of the disclosed technology that incorporate the use of neuroscientific tools can constitute one such mechanism. As pointed out by pioneering work on the potential value of neuroscientific data for assigning criminal responsibility, mental state inference is central to legal decision-making. In the case of a reasonable person test, the mental states in question can range from sensory percepts to memories and judgments, among others. Importantly, some of these mental states possess well-studied and well-understood neural representations that could be probed by measuring the corresponding neural responses. Thus, these representations might serve as a useful means to address the long-standing concerns among legal scholars summarized above.

Certain implementations may seek to assess the possible evidentiary value of neuroscientific data by focusing on disputes involving arguably the best understood set of processes in modern neuroscience—those involved in visual processing. Because visual cues, such as trademarks and package designs, play an outsized role in determining how consumers respond to products, laws governing trademarks forbid counterfeit and lookalike products on grounds that they harm consumer welfare by misleading potential buyers. In disputes involving trademark infringement, plaintiffs must therefore show that the alleged infringing trademark causes consumer confusion. Although the legal criteria for "consumer confusion" include a number of defined factors, ranging from 6 to 13 depending on the jurisdiction, empirical studies of legal decision-making have shown that assessments of "visual similarity" exert by far the greatest weight on the court's judgment.

Focus on reasonable person tests in general, and on questions of visual similarity in particular, offers several important advantages in maximizing the utility of neuroscientific data to the law. First, that the reasonable person does not hinge on the mental state of a specific individual allows us to sidestep what is sometimes called the group to individual ("G2i") inference problem in scientific expert testimony. This problem refers to the difficulty of translating scientific findings regarding general mechanisms, which are typically established on an aggregate level (e.g., factors that influence accuracy of eyewitness recollections), to address questions pertaining to a specific individual in a particular case at hand (e.g., the accuracy of a specific eyewitness's testimony). In contrast, the intrinsic reliance of the reasonable person test on aggregate responses reduces the demand on the precision of neuroscientific methods, where limited signal-to-noise ratio and spatiotemporal precision complicate interpretation in single subjects.

Second, by focusing on questions of visual similarity, certain implementations can leverage current knowledge of the visual system, which can be seen as providing an "upper bound" on the discriminatory power of neural data. In particular, there is broad consensus on the construct validity and neuroanatomical substrates of different visual processes. Substantial evidence from both lesion and neuroimaging studies indicates that regions within the fusiform and inferotemporal cortices engage in holistic, as opposed to parts-based, representation of objects. Moreover, the deep history of experimental studies that produced this knowledge provides a robust basis for validated experimental design. Finally, despite skepticism surrounding the use of survey data, the fact that surveys can be accepted by the court offers an opportunity for neuroscientific data to either buttress or challenge their validity. Trademark infringement cases, which routinely include survey evidence even if it is often discounted by the court, allow for the design of tests capable of addressing concerns of implicit or explicit bias. This possibility stands in sharp contrast to other areas of the law, such as copyright law, in which the use of survey data is prohibited under the assumption that aesthetic reactions are not measurable.

Capitalizing on these strengths, certain implementations may address some of the central challenges in using neural data in legal settings. First, to avoid potential biases introduced by mere elicitation, participants who were blind to the goal of the study were scanned using a passive viewing paradigm optimized for fMRI repetition suppression (fMRI-RS). fMRI-RS takes advantage of the fact that the neural response declines upon repeated presentation of the same stimulus. This phenomenon appears to be a general property of neurons, has been shown to be highly robust across brain regions, and can be observed using different measurement techniques, including fMRI. Substantial evidence indicates that the relative suppression between two distinct stimuli can be used to assess the degree of overlap in neural representations of these stimuli. Thus, by repeatedly presenting the likeness of different products, an index of visual similarity can be constructed using neural responses from object-sensitive regions of the visual system identified a priori.

Next, to demonstrate its incremental utility in legal applications, the extent to which this neural index is capable of detecting biases in self-report surveys was tested. Due to the difficulty in obtaining materials used in actual legal disputes, a set of surveys was constructed with experimenter-induced biases that drew upon past criticisms of litigation surveys. Specifically, the survey design was manipulated such that results varied in how strongly they favored either the plaintiff or the defendant. The neural index was sufficiently precise to detect examples of these experimenter-induced biases, suggesting that combining neural and self-report measures may provide a more robust measure than the latter by itself.

It should be understood that the brief description above is provided to introduce in a simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below.

DETAILED DESCRIPTION

Many areas of intellectual property law involve subjective judgments regarding "confusion" or "similarity." In trademark or trade dress lawsuits, for example, a key factor considered by the court is the degree of visual similarity between the trademark or product designs under consideration. Such similarity judgments are nontrivial; they may be complicated by cognitive factors such as categorization, memory, and reasoning that vary substantially across individuals. Currently, three forms of evidence are widely accepted: visual comparison by litigants, expert witness testimonies, and consumer surveys. Because all three rely on subjective reports of human responders, whether litigants, expert witnesses, or consumer panels, all three forms of evidence potentially share the criticism that they are subject to overt (e.g. conflict of interest) or covert (e.g. inaccuracy of self-report) biases.

Implementations of the disclosed technology generally include a neuroscientific method developed to directly measure the mental state of consumers when they attend to visual images of consumer products, without the need for self-report measures such as questionnaires or interviews. In so doing, this neuroscientific method reduces the potential for biased reporting. This approach may be used, for example, in litigation involving subjective impressions about the similarity of trademarks, where it might replace or validate existing evidence such as consumer surveys or expert opinion.

Implementations of the disclosed technology generally include a brain-based method of measuring trademark similarity that does not involve explicit evaluations of visual similarity. This method may be based on repetition suppression (RS), which refers to the fact that the activity of neurons decreases from one stimulus to the next if the stimuli share features to which the neurons are sensitive. Importantly, the extent of such decreases is proportional to the degree of perceived similarity between the stimuli.

RS therefore provides the conceptual basis for using functional magnetic resonance imaging (fMRI) scanning to extract brand similarity perception from participants during passive viewing. Brain data are then processed with an analysis pipeline that follows best practices in the field. No previous attempts have been made to apply RS to the consumer experience in order to more objectively quantify product similarity.

Performance of the disclosed brain-based metric was tested by comparing it against a series of self-report measures that varied in the amount of bias. Compared to an impartial survey, the disclosed metric demonstrated a high level of correlation between subjective and neural measures of similarity. In contrast, against two deliberately biased surveys that used leading questions to inflate or deflate the similarity score, respectively, there was a significantly poorer correlation—arguing that the functional MRI data were more faithful to the similarity judgment. Thus, the disclosed technique could not only be deployed as a stand-alone form of evidence in court, but also to validate well-conducted self-reports or to differentiate between biased and less biased surveys, which in turn may advantageously clarify whether to reject or accept survey results as proof of evidence.

Further, legal tests invoking the viewpoint of a so-called reasonable person play an important role in many domains of the law, ranging from intellectual property to free speech. In such cases, a central question involves determining how a hypothetical individual with "an ordinary or average level of care, prudence, or knowledge" would respond. Despite the seemingly commonsensical nature of these tests, their judicial application can be controversial due to concerns about subjectivity and vulnerability to explicit or implicit biases. The disclosed technology takes a step toward addressing these concerns by using neuroscientific tools to observe, without the use of self-report, the nature of mental representations central to a set of disputes invoking the reasonable person. Specifically, using an fMRI-based measure, repetition suppression, to generate a neural index of subjective visual similarity, implementations can inform the application of the reasonable person test to a class of intellectual property law that evaluates whether a trademark is so similar to another as to generate consumer confusion. By leveraging well-established neuroscientific knowledge about visual processing, it is possible to construct a parsimonious neural index of subjective similarity using signals from object-sensitive brain regions identified a priori. Moreover, this neural index, aggregated across multiple participants, is sufficiently precise to detect instances of experimenter-induced bias in behavioral reports. Together these findings shed light on the potential evidentiary value of neuroscientific data to inform questions involving the reasonable person and suggest a novel domain for the use of neuroscience in law.

fMRI-RS Response as Index of Trademark Visual Similarity

To develop a neural index of perceived visual similarity, an fMRI-RS experimental paradigm was applied to a set of stimuli designed to capture typical cases involving trademark infringement (Methods). Specifically, a scenario involving potential trademark infringement of a common candy in the U.S., Reese's Peanut Butter Cups, was considered as well as a common laundry detergent, OxiClean. Reese's was selected in part because of its role in a 2014 lawsuit to prevent the import of the British candy Toffee Crisp on infringement grounds. OxiClean was selected to create variation in visual appearance of the trademarks (e.g., color) as well as to evaluate a non-appetitive item.

Next, for each category, either candy or cleaning product, a set of comparison products was created that varied in visual similarity assessed according to pretests. Some stimuli, such as Toffee Crisp or Tide, were based on real products, whereas others, such as Pieces and Breeze, were fictitious. While real products are typically dissimilar to our products of interest for legal reasons, two cases of real product variants that are of high similarity and from the same manufacturers were included: a brand extension product of Reese's (Reese's Sticks) and an international version of OxiClean. Hereafter Reese's and OxiClean are referred to as the "reference product" for their respective categories, whereas other products are described as "competitor products". In total each category consisted of 10 products, including the reference product itself, the aforementioned product variant from the same manufacturer, and 4 fictitious products plus 4 other real brands of varying similarity to the reference product.

Figure 1A:
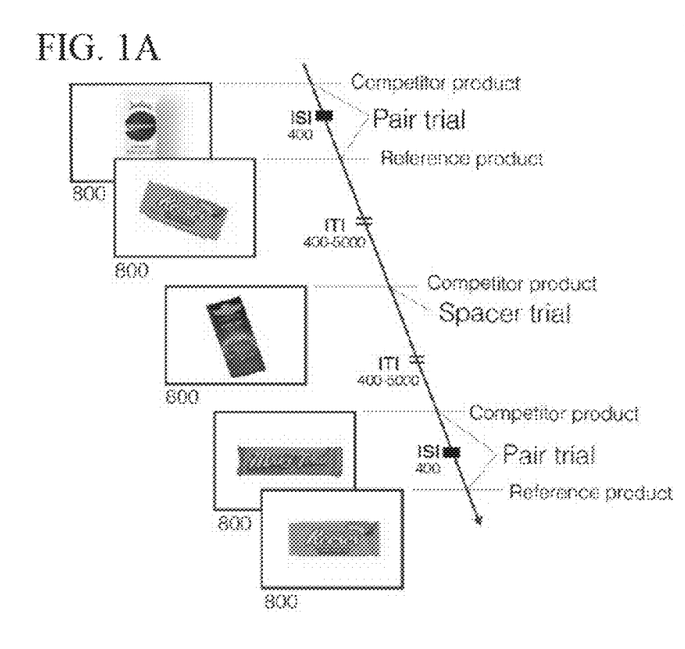
FIG. 1A illustrates an example of the fMRI paradigm in which participants viewed a continuous stream of product images that were organized as pair trials and spacer trials.

During the task, participants viewed rapid presentations of product images, shown randomly in one of three possible viewing angles, as illustrated by FIG. 1A. Importantly, each of the competitor products and the reference product were grouped to form category-specific pairs, in which a competitor product was followed by the reference product after a short interval. Pairs with two consecutive presentations of the reference product were also included. Additional single presentations of the competitor products ("spacer trials") were randomly interleaved to minimize appearance of temporal regularities in the presentation of the pairs. Participants were not provided the goal of the study; instead, they performed an unrelated task in which they pressed a button every time they saw an inverted image, which appeared on average every nine trials in a pseudorandom manner.

Figure 1B:
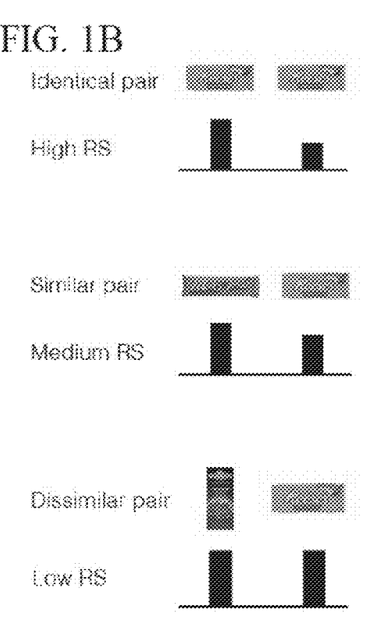
FIG. 1B illustrates an example of predictions for brain responses in pair trials.
Figure 1C:
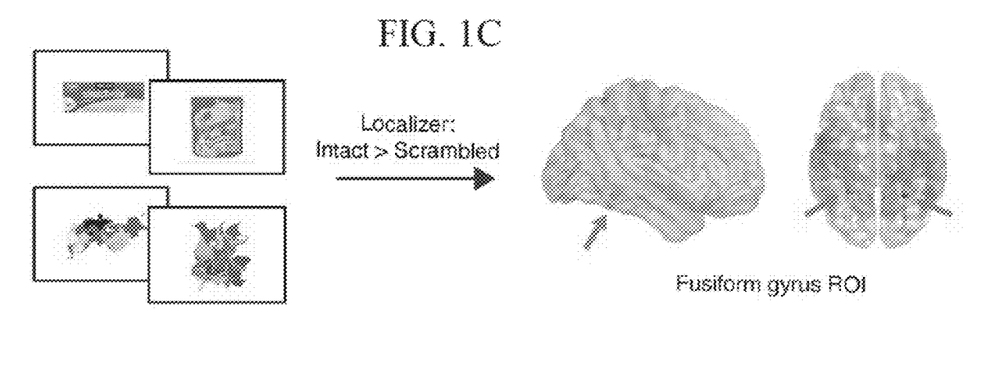
FIG. 1C illustrates an example of spherical regions of interest for object-sensitive brain areas.

According to the principle of fMRI-RS, it was hypothesized that the response to the reference product in object-sensitive brain regions, in particular within the ventral occipitotemporal cortex, would be suppressed to a degree that would vary as a monotonic function of its similarity with the preceding competitor product, as illustrated by FIG. 1B. To independently identify object-sensitive regions, a functional localizer task was conducted in which participants were shown object images and scrambled images matched on low-level visual features, as illustrated by FIG. 1C. Consistent with previous studies, a contrast of object versus scrambled images strongly implicated areas in the object-sensitive ventral occipitotemporal cortex, including the fusiform gyms.

FIGS. 1A-C together illustrate an example of measuring perceived similarity with repetition suppression. FIG. 1A illustrates an example of the fMRI paradigm in which participants viewed a continuous stream of product images that were organized as pair trials (a competitor product followed by the reference product from the same category) and spacer trials (standalone presentations of competitor products). In the figure, numbers represent the duration of each phase of the trial in milliseconds, where ISI stands for the inter-stimulus interval in pair trials, and ITI indicates the inter-trial interval. During the ISI and ITI, a fixation cross was presented at the center of a white screen (omitted here for clarity). FIG. 1B illustrates an example of predictions for brain responses in pair trials. For the second (i.e., reference) product, the strength of the neural response, illustrated by the height of the bar, increases as a function of decreasing visual similarity with the first product; that is, it shows less repetition suppression (RS). FIG. 1C illustrates an example of spherical regions of interest (ROIs) for object-sensitive brain areas. In the example, these 5 mm radius ROIs in bilateral fusiform gyms were defined by a contrast of intact versus scrambled images, as presented during an object localizer task.

Next, neural responses were extracted in the fusiform gyri for the pairs in the main fMRI task and defined a neural similarity index based on a linear transformation and normalization of the raw fMRI-RS effect (Methods), such that values for the index ranged from 0 (greatest activity/weakest RS, and thus lowest similarity) to 1 (weakest activity/strongest RS, and thus maximal similarity). For the upper end of the scale, the fMRI-RS effect elicited by consecutive presentations of the same reference product was used, since the reference product is most similar to itself. For the lower end of the scale, the competitor product with the weakest fMRI-RS effect was used. Importantly, the frequency of occurrence of the reference products, and the temporal regularities between the competitor products and the reference products, were held constant across all competitor products; thus, these aspects of the task design would not explain any differential fMRI-RS effects across competitors.

Figure 2A:
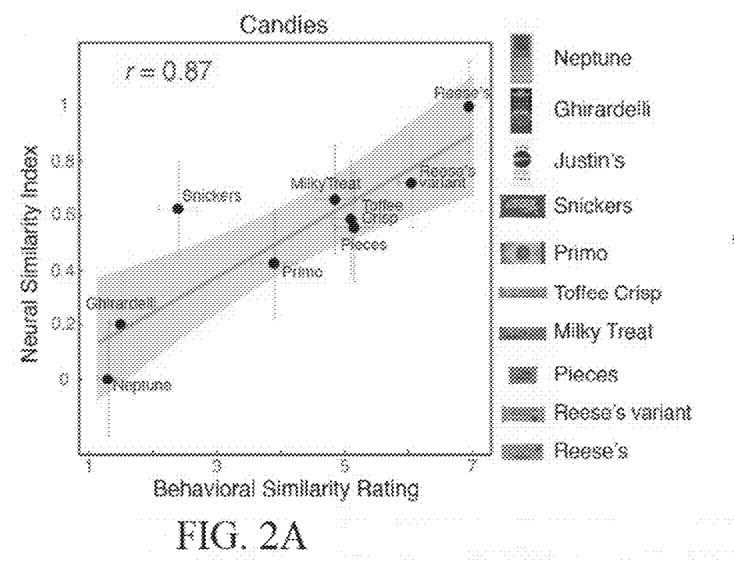
FIGS. 2A and 2B together illustrate an example of a neural similarity index derived using fMRI-RS from object-sensitive ROIs being strongly associated with subjective visual similarity ratings.
Figure 2B:
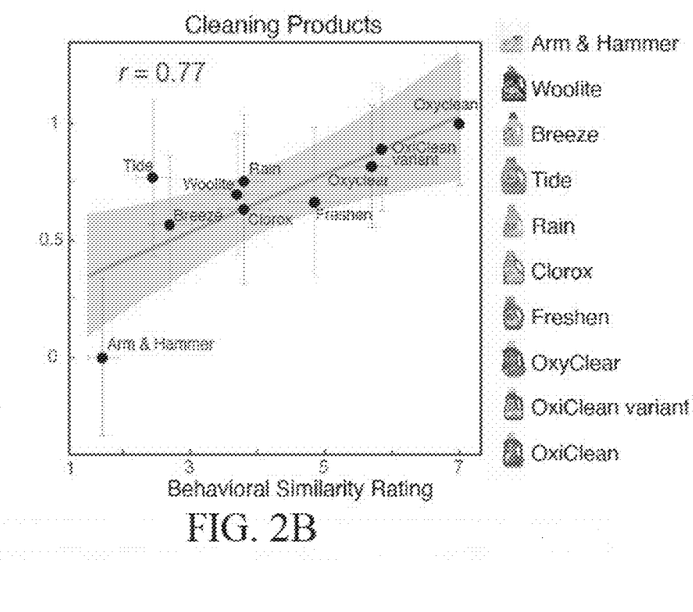

By comparing the neural similarity index with the visual similarity ratings from the same participants collected after the scan, it was confirmed that stronger fMRI-RS (i.e., higher neural similarity index) corresponds to a higher degree of visual similarity between a competitor product and the reference product, as illustrated by FIG. 2. Furthermore, the neural similarity index was strongly associated with the visual similarity ratings (Pearson r=0.87 and 0.77 for candy and cleaning products, respectively; p<0.01 for both).

FIGS. 2A and 2B together illustrate an example of a neural similarity index derived using fMRI-RS from object-sensitive ROIs being strongly associated with subjective visual similarity ratings. In the example, the neural similarity index calculated from the mean neural response to the pair trials is plotted against the average similarity ratings for candies and detergent products, respectively (ratings for Justin's in the candy category were not collected due to a coding error in the post-scan survey). Best fitting lines from linear regression models, along with 95% confidence bands, are included. Error bars indicate the standard error of the mean (SEM).

The neural measure was derived from brain activities using a behaviorally orthogonal task in which no similarity judgments were elicited from the participants. Therefore, the alignment between the neural similarity index and the ratings cannot be explained as the result of a simple mapping between the explicit similarity judgments and the brain activities while such judgments were made. To address any potential concern that the neural index captured low-level visual features as opposed to the holistic percept, it was further examined how the fMRI-RS effect varied as a function of viewing angle. Comparing trials with images that were shown in the same viewing angle versus those shown in a different angle, no evidence was found for viewing angle as either main effect (p=0.89 for candies, p=0.71 for cleaning products) or interaction with similarity (p=0.20 for candies, p=0.16 for cleaning products). In addition, it was found that there was little evidence for the involvement of other regions outside of the fusiform gyms, even at a liberal threshold. This anatomical specificity lends further support to our focus on activities in the object processing regions of the brain to derive the neural similarity index.

Incremental Validity of the Neural Index

While the observed strong relationship between brain and self-report is significant, it remains unclear whether the neural relationship can detect possible biases introduced into self-report data, intentionally or not, by interested parties. Accordingly, the value of the neural index as a potential benchmark was testing by the creating of a set of self-report surveys with varying degrees of experimental biases. These biases respectively favored either the proposed plaintiffs—in this case, the reference products, Reese's and OxiClean—or highly similar defendants that were chosen to resemble real-world "knockoff" brands, Pieces and OxyClear.

The surveys drew upon documented criticisms of litigation surveys presented in trademark infringement lawsuits as well as the recent scientific literature on "questionable research practices" that greatly inflate the likelihood of false positive findings. Specifically, biases were induced through (i) explicit means, such as referring to trademark infringing products as "copycats" for the Plaintiff-favoring survey, and companies pursuing trademark infringement lawsuits as "trademark bullies" for the Defendant-favoring survey; and (ii) more subtle means, such as the format of the questions and the criteria for making similarity judgments.

Figure 3:
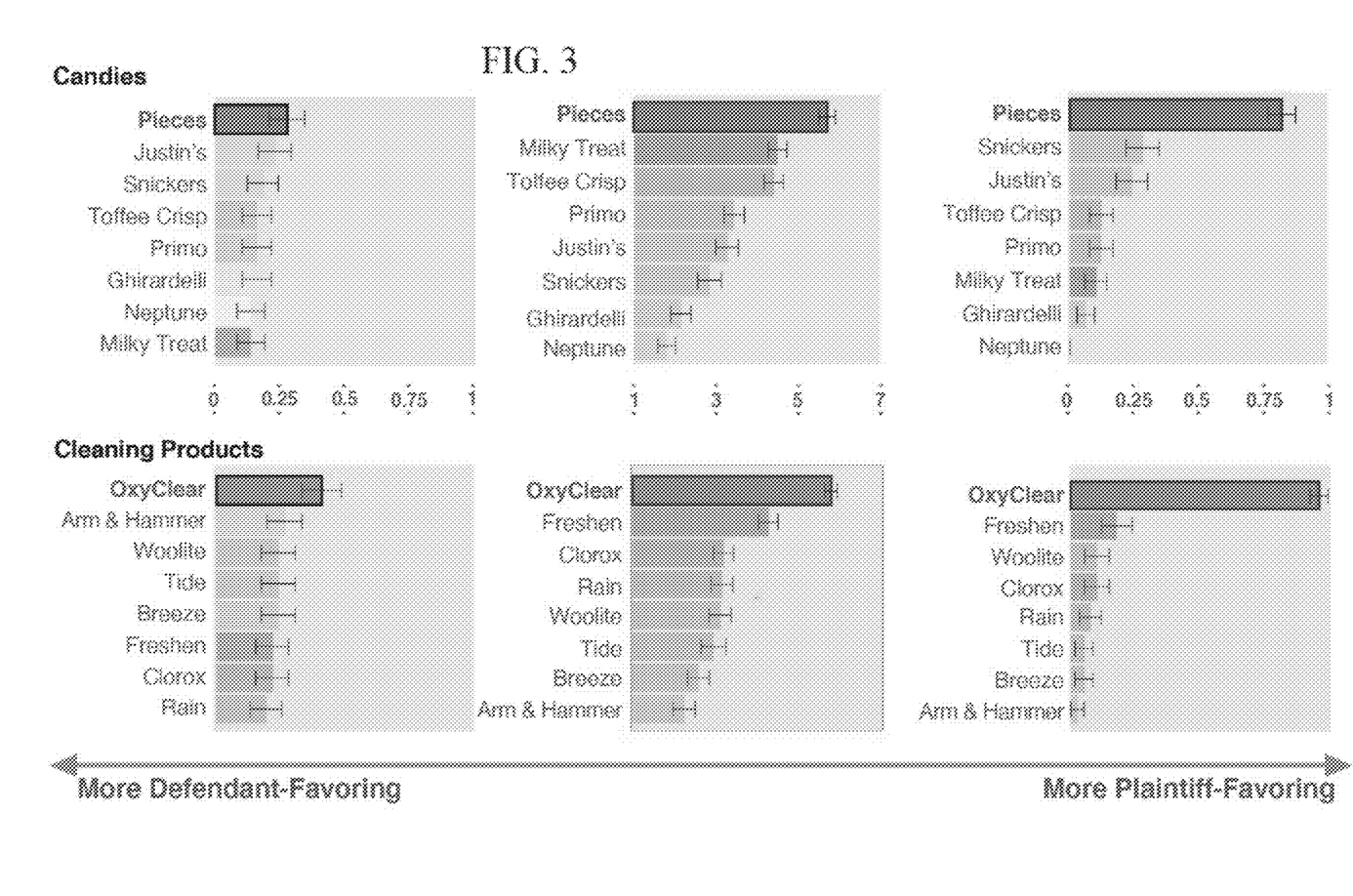
FIG. 3 illustrates an example of contradictory behavioral reports of subjective visual similarity resulting from experimenter-induced biases.

Comparison between results from the three surveys based on data collected from independent samples showed that the manipulations produced the intended biasing effects in self-reported similarity, as illustrated by FIG. 3. In particular, changes in responses were most pronounced with regard to the defendants' products, Pieces and OxyClear. In the putatively "Plaintiff-Favoring" survey, they received similarity scores that were substantially higher than any other product, painting an exaggerated picture of how much more similar they were to the reference products relative to other competitors. On the contrary, in the putatively "Defendant-Favoring" survey, their reported similarity scores were more or less comparable to those of the other competitor products.

FIG. 3 illustrates an example of contradictory behavioral reports of subjective visual similarity resulting from experimenter-induced biases. The Defendant-Favoring survey (left) shows significantly lower similarity ratings (x axis) for Pieces and OxyClear, relative to comparison products, than either the Neutral (middle) or the Plaintiff-Favoring (right) surveys. The latter (right) shows higher subjective similarity ratings for alleged copycat products Pieces and OxyClear, relative to comparison products, than either the Neutral or the Defendant-Favoring surveys. In the example, numbers on the x axes represent either similarity ratings on a 1-7 scale (Neutral survey) or the proportion of subjects who judged the competitor product as similar to the reference product (Defendant-Favoring and Plaintiff-Favoring surveys).

The extent to which the neural similarity index can be used as a benchmark to quantitatively compare the different surveys was assessed. Specifically, the mean squared distance (MSD) between the neural similarity index and the normalized behavioral similarity score was measured for each survey to compare the relative alignment of pairs of surveys against the neural similarity index. In both categories, the MSD of the putatively neutral survey was significantly lower than that those of the putatively Plaintiff-Favoring and Defendant-Favoring surveys, as illustrated by FIG. 4 (in which p<0.001 for both Neutral vs. Plaintiff-Favoring and Neutral vs. Defendant-Favoring in both categories), suggesting that the neural similarity index is indeed capable of distinguishing between surveys containing different amounts of bias.

Figure 4A:
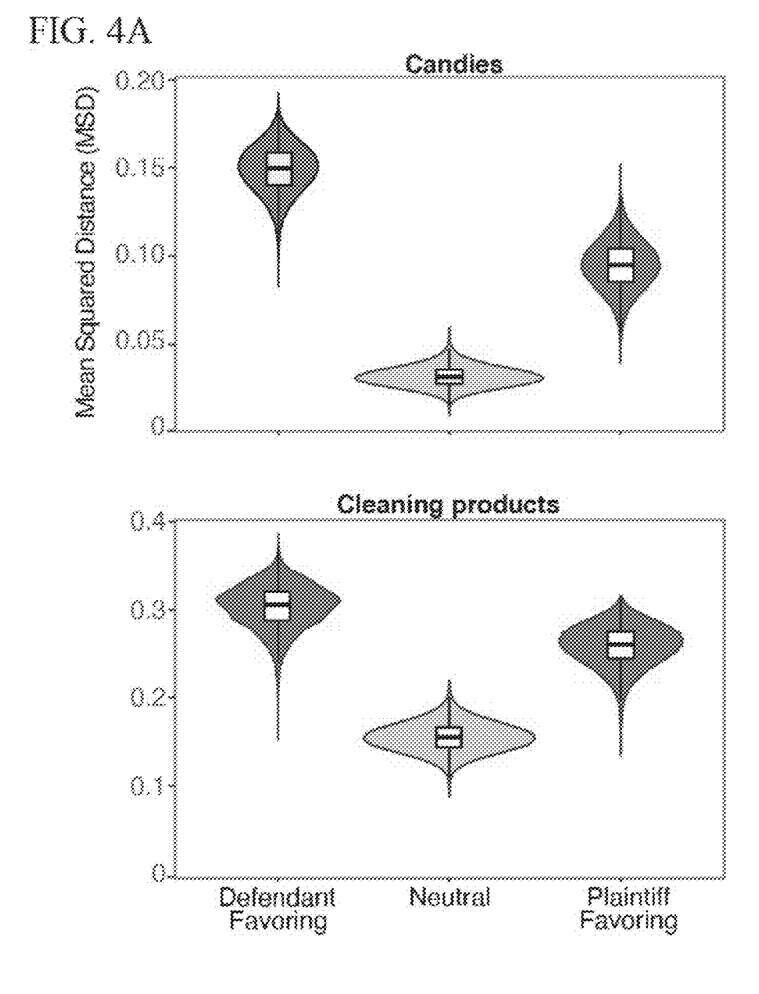
FIG. 4A illustrates violin plots of the distribution of brain-behavior distance for each survey.
Figure 4B:
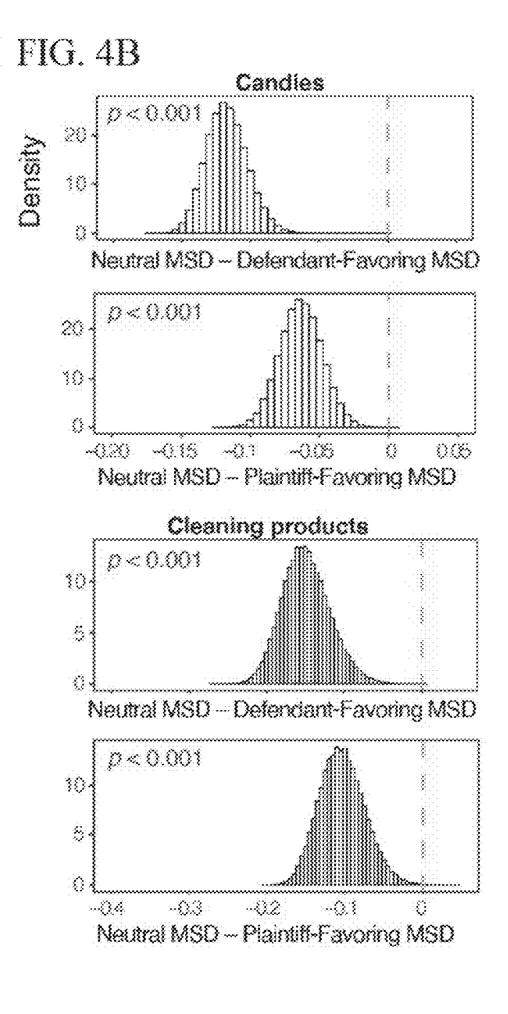
FIG. 4B illustrates an example of comparison of brain-behavior distance between conditions.

FIG. 4 illustrates an example of using the neural similarity index as a benchmark to compare contradictory behavioral reports. FIG. 4A illustrates violin plots of the distribution of brain-behavior distance for each survey. In the example, distance was calculated as mean squared deviation (MSD) between normalized neural and behavioral measures using a bootstrap resampling procedure. The boxplot within each violin further displays the median and interquartile range. FIG. 4B illustrates an example of comparison of brain-behavior distance between conditions. In the example, each plot displays a histogram of the difference between the Neutral survey and the Plaintiff-Favoring or Defendant-Favoring surveys, across all bootstrap iterations.

Replicability and Sensitivity

The replicability and sensitivity of the findings was tested by asking whether the neural index is capable of detecting more subtle forms of bias. Specifically, some of the more prominent manipulations in the surveys were removed, such as references to "copycats" and "bullies".

Figure 5A:
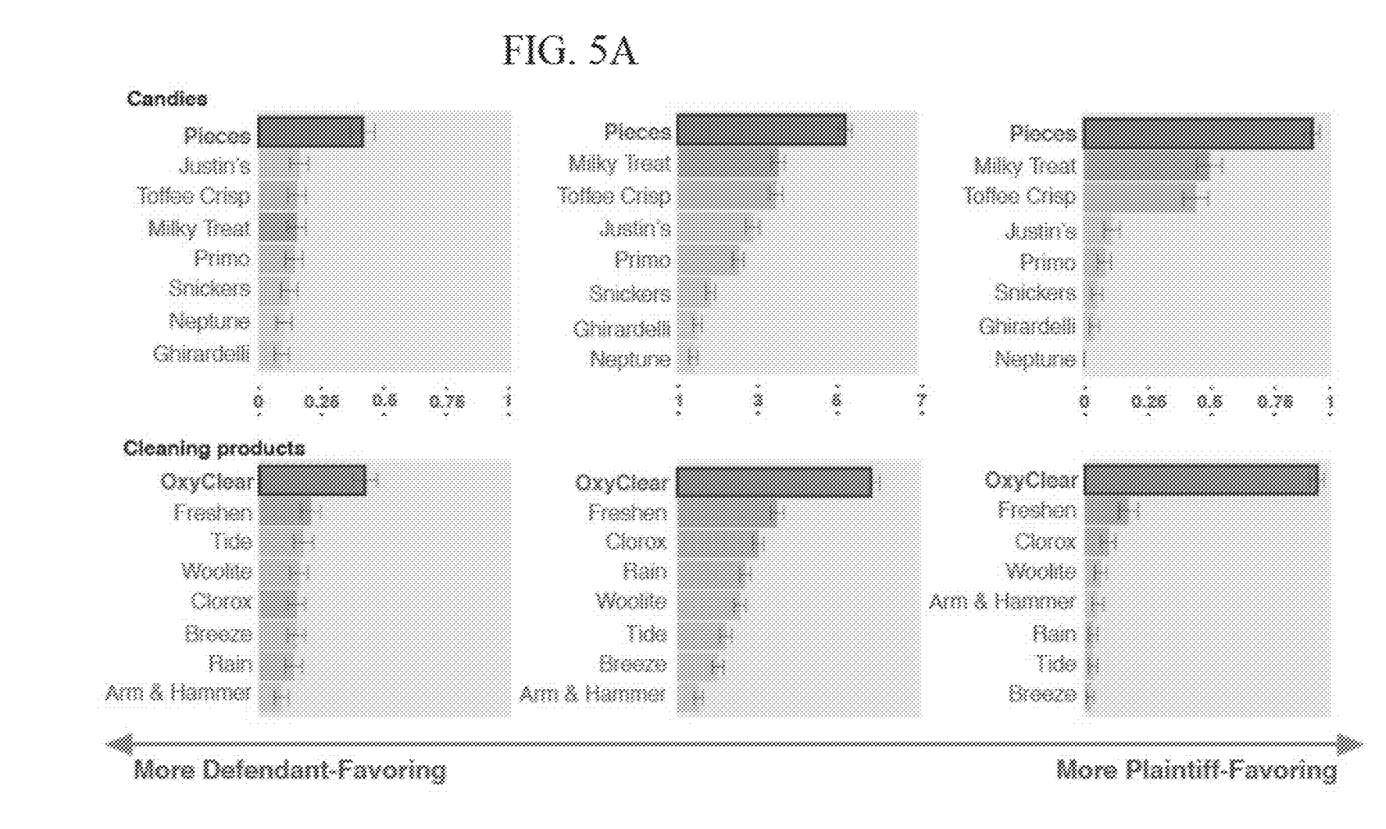
FIG. 5A illustrates behavioral reports that replicated the direction of bias in FIG. 3 but with diminished magnitude.

As expected, the intended biasing effects were diminished in the putatively Plaintiff-Favoring and Defendant-F surveys that were modified, as illustrated by FIG. 5A. In the former, while the defendant's products still received the highest similarity scores, the difference with the other competitor products was less dramatic, particularly in the candy category. Likewise, the similarity scores for the defendant's products stood out to a larger extent in the Defendant-Favoring surveys. At the same time, the general biasing effects of the Plaintiff-Favoring and Defendant-Favoring surveys persisted, and the overall pattern of the behavioral responses to the different surveys remained similar to the previous results.

Figure 5B:
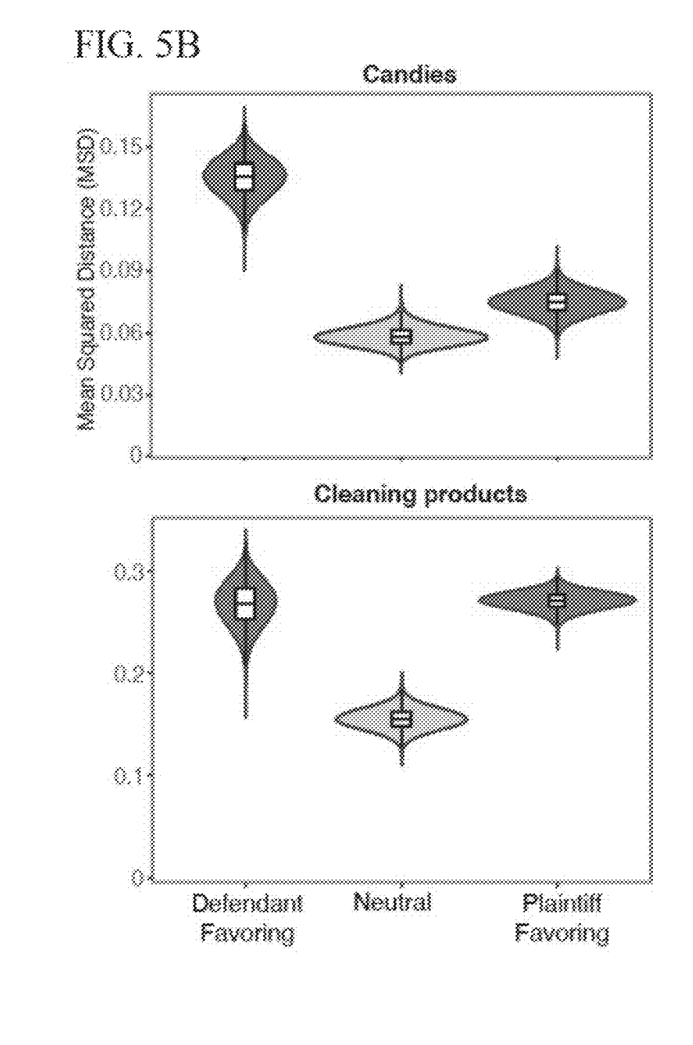
FIG. 5B illustrates violin plots of the distribution of brain-behavior distance for each survey.

Using the same procedure as the previous study, it was found that in both categories the MSD of the neutral survey remained significantly lower than those of the Plaintiff-Favoring and Defendant-Favoring surveys, as illustrated by FIG. 5B (in which $p<0.001$ for Neutral vs. Defendant-Favoring and $p=0.02$ for Neutral vs. Plaintiff-Favoring in candies, $p<0.001$ for both comparisons in cleaning products). Thus, even in the case of the Plaintiff-Favoring survey for candies, where the ratings are qualitatively similar to those in the Neutral survey, the neural index was able to identify the latter as the more accurate survey, albeit at a lower level of confidence. Nevertheless, these results provide support for the idea that our neural similarity index can identify even fairly nuanced forms of bias in survey evidence.

Figure 5C:
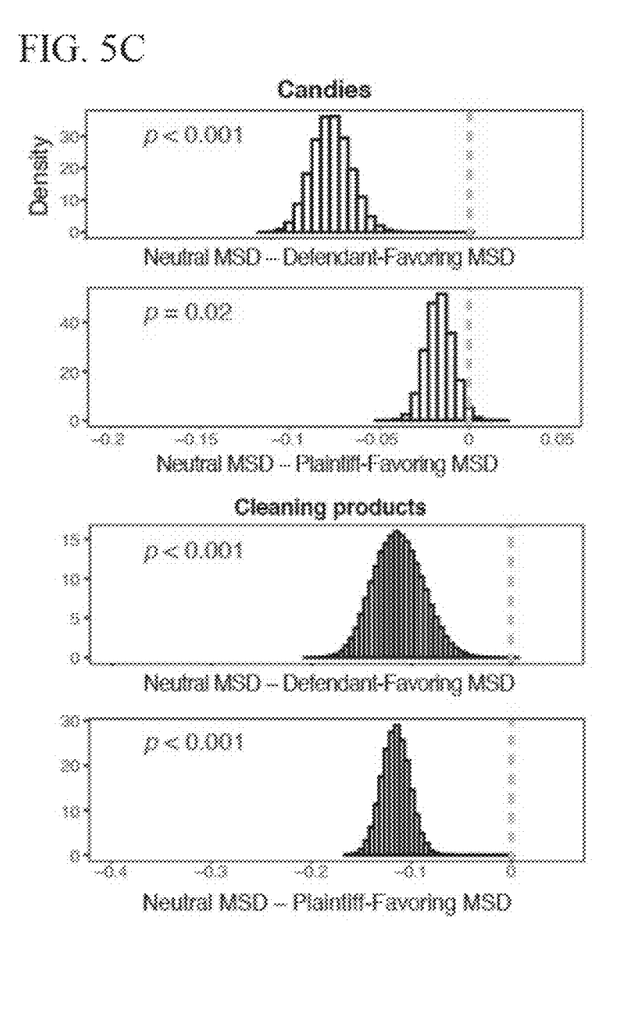
FIG. 5C illustrates a comparison of brain-behavior distance between neutral survey and plaintiff-favoring (defendant-favoring) surveys.

FIG. 5 illustrates an example of assessing robustness and sensitivity of neural similarity index as benchmark. FIG. 5A illustrates behavioral reports that replicated the direction of bias in FIG. 3 but with diminished magnitude. The format of the figure is the same as that for FIG. 3. FIG. 5B illustrates violin plots of the distribution of brain-behavior distance for each survey. The format of the figure is the same as that of FIG. 4A. FIG. 5C illustrates a comparison of brain-behavior distance between neutral survey and plaintiff-favoring (defendant-favoring) surveys. The format of the figure is that same as that of FIG. 4B.

Discussion

Originating in the 19$^{th}$ century in tort law related to questions of negligence, legal tests invoking the viewpoint of a so-called reasonable person now play an instrumental role in nearly every area of the legal system. Despite vast differences in its application, legal scholars underscore a shared need for more objective ways of applying such tests. In particular, concerns about an over-reliance on either intuition or evidence of uncertain reliability have led to criticism that the standard exists primarily "in the eye of the beholder," or even that it serves as "a shell through which actors exercise the widest sort of discretion to select their favored outcomes or policies."

The disclosed technology seeks to address the need articulated by judges and legal scholars to better align the tests with their goals. Specifically, using aggregate neural signatures of relevant mental states as an empirically grounded measure, certain implementations can address, at least within the parameters of the present experiment, some common conundrums facing the court and the litigants, such as: How can one assess the mental state of some group of individuals without relying on their self-report? When the pieces of evidence presented by the opposing parties are contradictory, how should one determine their respective credibility?

A key strength of the disclosed approach to these questions lies in the use of fMRI-RS to give a direct readout of the representational differences between stimuli. Importantly, this technique allows for the eliciting of participant responses even as they are blind to the purpose of the study, and even without explicit instructions on the nature of the desired comparisons. Consequently, these features allow for direct addressing of the court's skepticism regarding (i) the ability of survey respondents to avoid allowing normative aspects of the question to color their judgments and (ii) the ability of partisan parties to exploit these vulnerabilities.

Such results represent a concrete step toward improving the relevance of neuroscientific findings for the law. On the one hand, the disclosed approach focuses on a specific, albeit common, instance of the broader legal need to determine the response of a reasonable person. On the other hand, the potential significance of a more scientific measure of legally-relevant mental states should be emphasized, particularly given the scarcity of existing empirical work in this area. In particular, three challenges identified in the pioneering study by Vilares and colleagues, who sought to identify "culpable mental states" ranging from purpose and knowledge to recklessness and negligence, were drawn upon. First, the relevant mental states may no longer exist at the time of the study, or exist in a much-altered form—for example, when they represent the memory of a mental state, rather than the state itself. In such cases, neural data may need to capture the person's evolving mental state over a time frame ranging from the recent to the distant past, a task that can be exceedingly challenging. Moreover, it is unlikely that visual processing is particularly malleable.

The second challenge concerns the issue of the representativeness of the sample. This is a surprisingly complex issue as the population of inference can vary greatly. For example, in trademark law alone, the relevant population may consist of all consumers, all consumers of a particular mark, or consumers within a particular market if the mark in question is distributed only locally. The disclosed methodological approach can be seen as presenting a basis for a practical and workable test of determining similarity.

Third, to address a challenge that may lie in the generalizability of the methods to real-world court, implementations may include an auditing and retesting procedure for surveys suspected of bias. This type of procedure, analogous to a replication study in scientific research, has found success in identifying cheating on standardized testing by showing that classrooms suspected of cheating experienced large declines in test scores when retested under controlled conditions.

The disclosed technology can further contribute by shedding light on opportunities and challenges of applying neuroscientific data to other instances of reasonable person tests. In copyright law, for example, a key legal test is the extent to which two works are "substantially similar" from the vantage point of the "ordinary observer." In obscenity law, one of the factors leading to removal of free speech protections concerns whether "the average person . . . would find that the [subject or work] appeals to the prurient interest," captured succinctly by Justice Potter Stewart's iconic expression that although he could not provide a concise definition for obscenity, "I know it when I see it." Importantly, a similar perception exists with respect to capriciousness and susceptibility to bias. Copyright scholars, for example, describe its application as "artificial and disappointingly inaccurate," and critics of obscenity law argue that "judges and juries are left to create their own standard in each case."

A total of 26 and 870 individuals participated in the fMRI and the behavioral studies, respectively. fMRI participants undergoing neuroimaging completed eight scanning sessions of the main task paradigm (see FIG. 1A), alternating between two product categories, and one session of the object localizer task (see FIG. 1C). Participants were not aware of the background or the purpose of the study, and they performed orthogonal detection tasks during the scans. Behavioral participants were recruited in two separate waves for three different versions of similarity surveys that were intended to induce biases in the responses in different directions. No participant underwent more than one survey version.

Event-related analyses of fMRI time series were performed either in the region-of-interest (ROI) identified from the object localizer task or on a whole-brain basis. Regressors were convolved with the canonical hemodynamic response function. In the main analysis, a neural similarity index was defined based on fMRI repetition suppression using blood-oxygen-level-dependent (BOLD) signals for each product, using the corresponding neural activations during the main task when it was paired with the reference product in the category. The neural similarity index was then correlated with the average visual similarity ratings obtained after the scan from the participants in the fMRI study.

To create experimenter-induced biases in behavioral measures of visual similarity, there were three versions of surveys designed: a Neutral survey, a Defendant-Favoring survey that aimed to create responses that favor the hypothetical, highly similar defendant products (Pieces and Oxy-Clear), and a Plaintiff-Favoring survey that aimed to favor the proposed plaintiffs (Reese's and OxiClean). Two samples were collected with these surveys, with the second sample using modified versions of the Defendant-Favoring and Plaintiff-Favoring surveys that removed some of the more prominent manipulations. To use the neural similarity index as a benchmark to assess the relative bias in the different surveys, the mean squared distance between each survey and the neural measure was computed, and a bootstrap procedure with 100,000 samples was used to determine statistical significance.

Implementations of the disclosed technology may be used, for example, by: law firms and their legal representatives in trademark infringement disputes and lawsuits for garnering empirical evidence supporting their claims; market research firms for evaluating similarities between products for their corporate clients; consulting firms that specialize in performing consumer surveys in litigations; and large retail chains trying to avoid litigation risk of store brand products.

Figure 6:
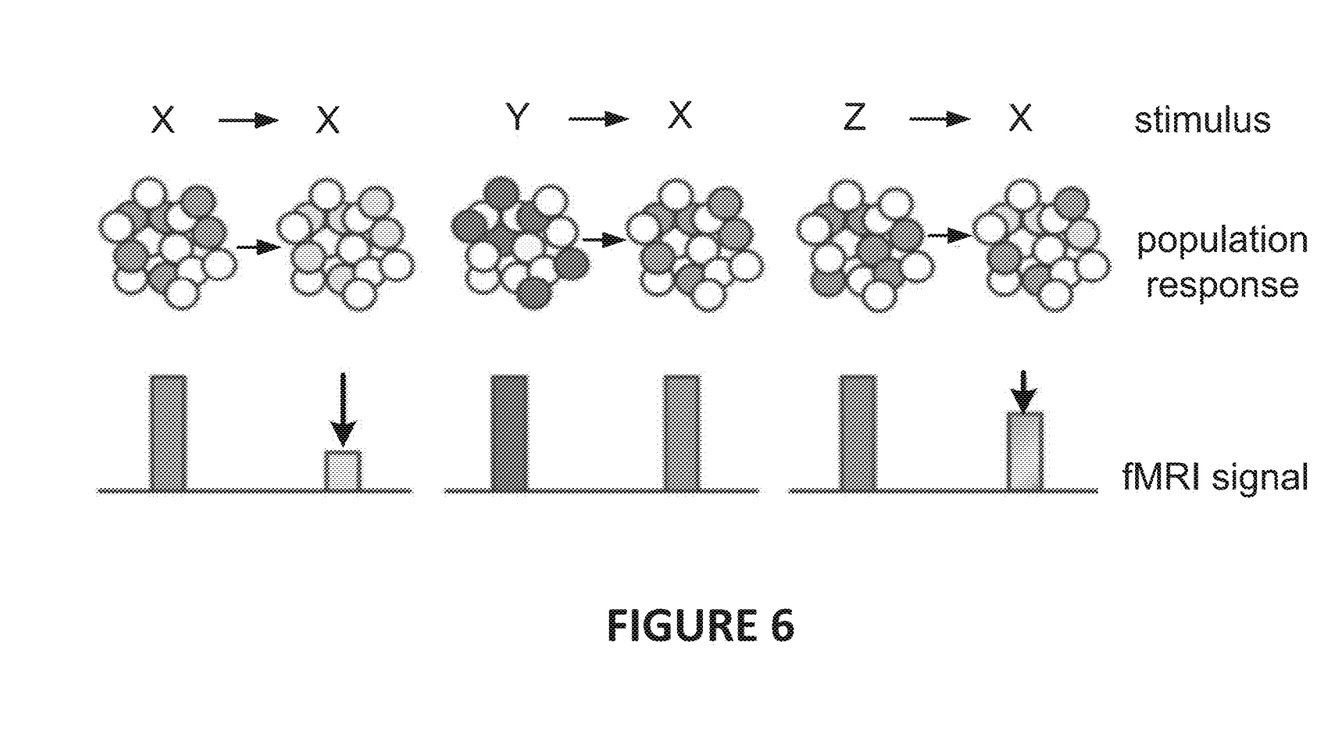
FIG. 6 is an example of a schematic illustration of the principle of repetition suppression.

FIG. 6. is a schematic illustration of an example of the principle of repetition suppression in which X, Y, and Z are three different stimuli. When X is presented twice, the pattern of neuronal population responses is identical and the maximal repetition suppression is observed in the fMRI signal (left). When Y, a stimulus completely different from X, is presented before X, the population responses are also distinct. As a result, there is no repetition suppression (middle). If Z, a stimulus that shares part of the features with but is still distinct from X, recedes the presentation of X, there is partial overlap with the population responses, and hence a moderate repetition suppression effect is seen (right).

Figure 7:
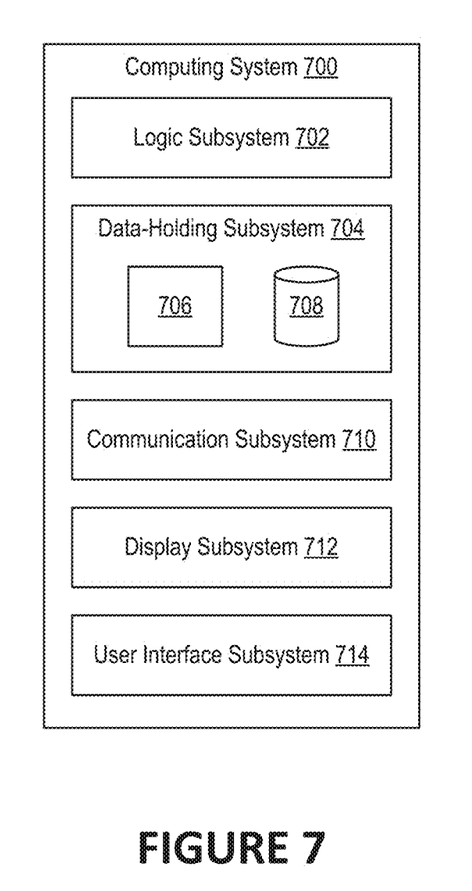
FIG. 7 shows a block diagram illustrating an example computing system 700 providing a platform for certain implementations of the disclosed technology.

FIG. 7 shows a block diagram illustrating an example computing system 700 providing a platform for certain implementations of the disclosed technology. It should be appreciated that the architecture of the computing system 700 is exemplary and non-limiting, and that other computer architectures may be used for a computing device without departing from the scope of the present disclosure. In different embodiments, the computing system 700 may comprise a mainframe computer, a server computer, a desktop computer, a laptop computer, a tablet computer, a network computing device, a mobile computing device, a mobile communication device, and so on. As depicted, the computing system 700 comprises a logic subsystem 702 and a data-holding subsystem 704. The computing system 00 may further include a communication subsystem 710, a display subsystem 712, and a user interface subsystem 714.

The logic subsystem 702 may include one or more physical devices configured to execute one or more instructions. For example, the logic subsystem 702 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 702 may include one or more processors that are configured to execute software instructions. In some examples, the logic subsystem 702 may include one or more hardware and/or firmware logic machines configured to execute hardware and/or firmware instructions. Processors of the logic subsystem 702 may be single core or multi-core, and the programs executed thereon may be configured for parallel or distributed processing. The logic subsystem 702 may optionally include individual components that are distributed throughout two or more devices, which may be remotely located and/or configured for coordinated processing. One or more aspects of the logic subsystem 702 may be virtualized and executed by remotely-accessible networked computing devices configured in a cloud computing configuration.

The data-holding subsystem 704 may include one or more physical, non-transitory devices configured to hold data and/or instructions executable by the logic subsystem 702 to implement the herein-described methods and processes. When such methods and processes are implemented, the state of data-holding subsystem may be transformed (for example, to hold different data).

The data-holding subsystem 704 may include removable media and/or built-in devices. Data-holding subsystem 704 may include optical memory (for example, CD, DVD, HD-DVD, Blu-Ray Disc, and so on), and/or magnetic memory devices (for example, hard disk drive, floppy disk drive, tape drive, MRAM, and so on), and the like. The data-holding subsystem 704 may include devices with one or more of the following characteristics: volatile, nonvolatile, dynamic, static, read/write, read-only, random access, sequential access, location addressable, file addressable, and content addressable. In some embodiments, the logic subsystem 702 and the data-holding subsystem 704 may be integrated into one or more common devices, such as an application specific integrated circuit or a system on a chip. In other embodiments, the data-holding subsystem 704 may include individual components that are distributed throughout two or more devices, which may be remotely located and accessible through a networked configuration.

When included, the communication subsystem 710 may be configured to communicatively couple the computing system 700 with one or more other computing devices. The communication subsystem 710 may include wired and/or wireless communication devices compatible with one or more different communication protocols. As non-limiting examples, the communication subsystem 710 may be configured for communication via a wireless telephone network, a wireless local area network, a wired local area network, a wireless wide area network, a wired wide area network, and so on. In some examples, the communications subsystem 710 may enable the computing system 700 to send and/or receive messages to and/or from other computing systems via a network such as the public Internet.

When included, the display subsystem 712 may be used to present a visual representation of data held by data-holding subsystem 704. As the herein-described methods and processes change the data held by the data-holding subsystem 704, and thus transform the state of the data-holding subsystem 704, the state of display subsystem 712 may likewise be transformed to visually represent changes in the underlying data. The display subsystem 712 may include one or more display devices utilizing any type of display technology. Such display devices may be combined with the logic subsystem 702 and/or the data-holding subsystem 704 in a shared enclosure, or such display devices may comprise peripheral display devices.

When included, the user interface subsystem 714 may include one or more physical devices configured to facilitate interactions between a user and the computing system 700. For example, the user interface subsystem 714 may comprise one or more user input devices including but not limited to a keyboard, a mouse, a camera, a microphone, a touch screen, and so on.

Aspects of the disclosure may operate on particularly created hardware, firmware, digital signal processors, or on a specially programmed computer including a processor operating according to programmed instructions. The terms controller or processor as used herein are intended to include microprocessors, microcomputers, Application Specific Integrated Circuits (ASICs), and dedicated hardware controllers.

One or more aspects of the disclosure may be embodied in computer-usable data and computer-executable instructions, such as in one or more program modules, executed by one or more computers (including monitoring modules), or other devices. Generally, program modules include routines, programs, objects, components, data structures, and so on, that perform particular tasks or implement particular abstract data types when executed by a processor in a computer or other device. The computer executable instructions may be stored on a computer readable storage medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGAs, and the like.

Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or computer-readable storage media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

Throughout this disclosure, various embodiments are presented in a range format. It should be understood that the description in range format is merely for convenience and brevity and should not be construed as an inflexible limitation on the scope of any embodiments. Accordingly, the description of a range should be considered to have specifically disclosed all the possible subranges as well of any individual numerical values within that range to the tenth of the unit of the lower limit unless the context clearly dictates otherwise. For example, description of a range such as from 1 to 6 should be considered to have specifically disclosed subranges such as from 1 to 3, from 1 to 4, from 1 to 5, from 2 to 4, from 2 to 6, from 3 to 6 etc., as well of any individual values within that range, for example, 1.1, 2, 2.3, 5, and 5.9. This applies regardless of the breadth of the range. The upper and lower limits of these intervening ranges may independently be included in the smaller ranges, and are also encompassed within the invention, subject to any specifically excluded limit in the stated range. Where the stated range includes one or both of the limits, ranges excluding either or both of those included limits are also included in the invention, unless the context clearly dictates otherwise.

The terminology used herein is for the purpose of describing particular embodiments only and is not intended to be limiting of any embodiment. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The previously described versions of the disclosed subject matter have many advantages that were either described or would be apparent to a person of ordinary skill. Even so, these advantages or features are not required in all versions of the disclosed apparatus, systems, or methods.

Additionally, this written description makes reference to particular features. It is to be understood that the disclosure in this specification includes all possible combinations of those particular features. Where a particular feature is disclosed in the context of a particular aspect or example, that feature can also be used, to the extent possible, in the context of other aspects and examples.

Also, when reference is made in this application to a method having two or more defined steps or operations, the defined steps or operations can be carried out in any order or simultaneously, unless the context excludes those possibilities.

Although specific examples of the invention have been illustrated and described for purposes of illustration, it will be understood that various modifications may be made without departing from the spirit and scope of the invention.

The invention claimed is:

1. A computer-implemented method, comprising:
    visually presenting visual stimuli to a plurality of participants in a plurality of runs, wherein the visual stimuli include a plurality of pairs of images, each pair including a reference product image and a competitor product image;
    performing a plurality of scans on the plurality of participants during passive viewing of the visual presenting, the plurality of scans including functional magnetic resonance imaging (fMRI);
    determining a similarity index based at least in part on results of the plurality of scans, the similarity index indicating a level a perceived similarity between the reference product image and the competitor product image.

2. The computer-implemented method of claim 1, wherein visually presenting the visual stimuli includes an initial presentation of the reference product image, an intervening fixation period, and a subsequent presentation of the competitor product image.

3. The computer-implemented method of claim 1, wherein the initial presentation is 800 ms and the subsequent presentation is 800 ms.

4. The computer-implemented method of claim 3, wherein the intervening fixation period is 400 ms.

5. The computer-implemented method of claim 1, wherein performing the plurality of scans further includes at least one selected from the group consisting of: an anatomical scan, a gradient field mapping scan, and a behavioral testing session.

6. The computer-implemented method of claim 1, wherein the plurality of runs includes eight 10-minute runs.

7. The computer-implemented method of claim 1, wherein the results of the plurality of scans include object-selective ROIs defined in the bilateral fusiform gyms.

8. The computer-implemented method of claim 1, wherein visually presenting the visual stimuli includes providing the visual stimuli at a selected one of a plurality of viewing angles.

9. The computer-implemented method of claim 8, wherein the selected one of the plurality of viewing angles is selected at random.

10. One or more tangible, non-transitory computer-readable media storing executable instructions that, when executed by a processor, cause the processor to perform the computer-implemented method of claim 1.

11. A system, comprising:
    at least one display device configured to visually present visual stimuli to a plurality of participants in a plurality of runs, wherein the visual stimuli include a plurality of pairs of images, each pair including a reference product image and a competitor product image;
    at least one scanning device configured to perform a plurality of scans on the plurality of participants during passive viewing of the visual presenting, the plurality of scans including functional magnetic resonance imaging (fMRI); and
    a processor configured to determine a similarity index based at least in part on results of the plurality of scans, the similarity index indicating a level a perceived similarity between the reference product image and the competitor product image.

12. The system of claim 11, wherein the visual stimuli includes an initial presentation of the reference product image, an intervening fixation period, and a subsequent presentation of the competitor product image.

13. The system of claim 11, wherein the initial presentation is 800 ms and the subsequent presentation is 800 ms.

14. The system of claim 13, wherein the intervening fixation period is 400 ms.

15. The system of claim 11, wherein the plurality of scans further includes at least one selected from the group consisting of: an anatomical scan, a gradient field mapping scan, and a behavioral testing session.

16. The system of claim 11, wherein the plurality of runs includes eight 10-minute runs.

17. The system of claim 11, wherein the results of the plurality of scans include object-selective ROIs defined in the bilateral fusiform gyms.

18. The system of claim 11, wherein the at least one display device is configured to visually present the visual stimuli at a selected one of a plurality of viewing angles.

19. The system of claim 18, wherein the selected one of the plurality of viewing angles is selected at random.

* * * * *